J. W. DAVIES.
APPARATUS FOR TREATING MILK AND OTHER FLUIDS.
APPLICATION FILED NOV. 22, 1909.
1,139,646.
Patented May 18, 1915.
2 SHEETS—SHEET 1.
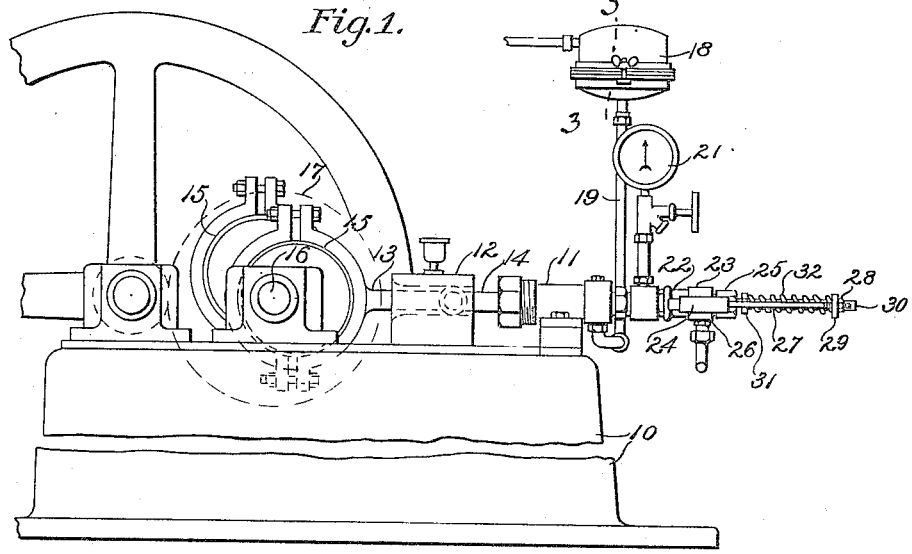
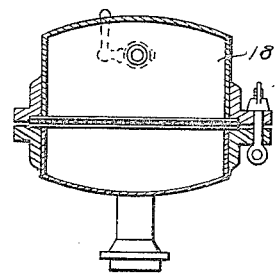
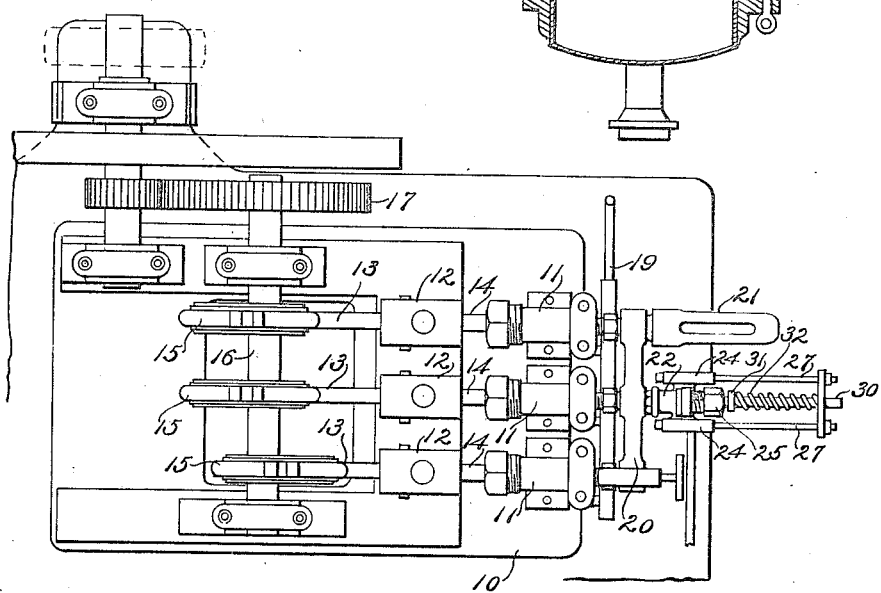
Witnesses.
H.C. Witt.
E.H. Wilder.
Inventor:
John W. Davies
By Henry J. Miller
atty.

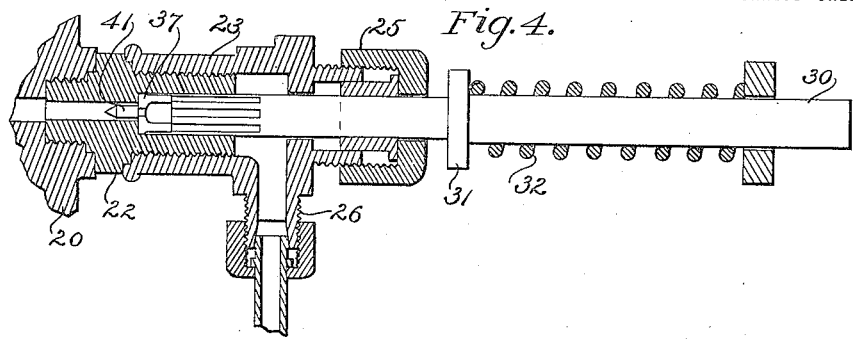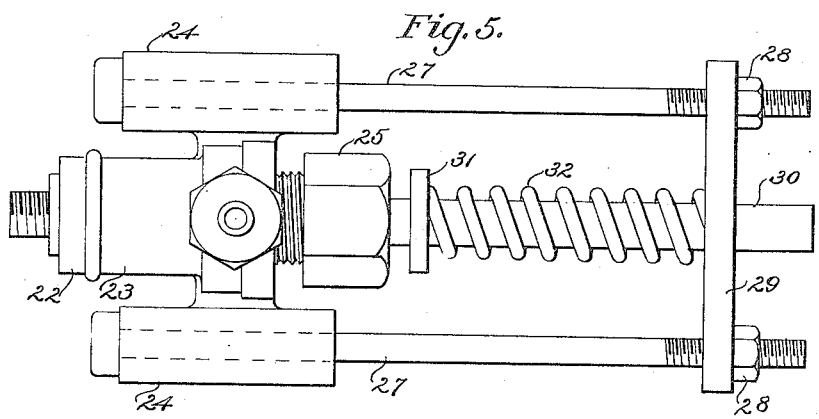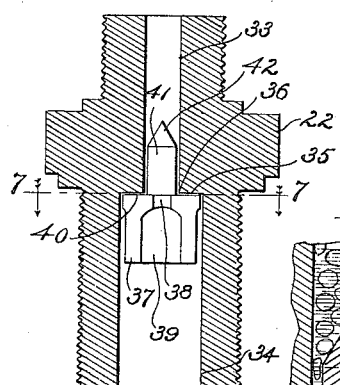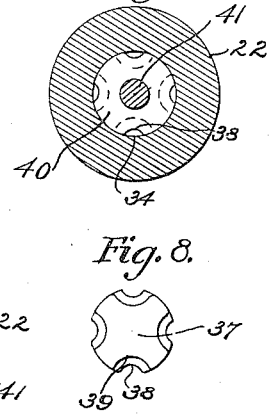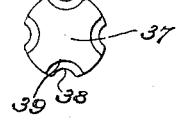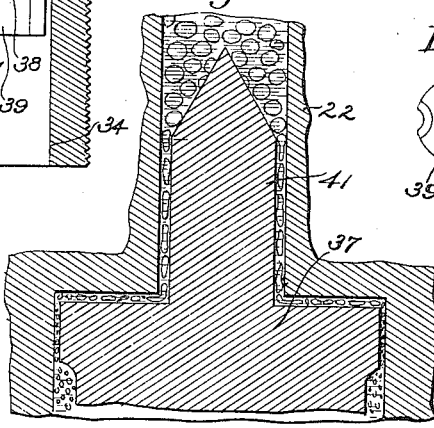

UNITED STATES PATENT OFFICE.

JOHN W. DAVIES, OF READING, MASSACHUSETTS.

APPARATUS FOR TREATING MILK AND OTHER FLUIDS.

1,139,646.      Specification of Letters Patent.      Patented May 18, 1915.

Application filed November 22, 1909. Serial No. 529,244.

*To all whom it may concern:*

Be it known that I, JOHN W. DAVIES, of Reading, in the county of Middlesex and State of Massachusetts, have invented certain new and useful Improvements in Apparatus for Treating Milk and other Fluids, of which the following is a specification, reference being had to the accompanying drawings, forming part thereof.

This invention has reference to improvements in apparatus for treating milk and other fluids or material containing fatty globules or particles to distribute the fatty substance evenly throughout the fluid or material forming the carrying medium for said fatty substance.

The invention will be hereinafter described with relation to its operation on milk and similar fluids containing fat in globular form but it is understood that this improved apparatus may be utilized with good effect on material of any kind, adapted to be passed through the machine, or on a combination of such materials.

The object of this invention is to emulsify or homogenize material passed through the apparatus.

The invention consists in the peculiar construction and combination of the globule squeezing and disintegrating elements.

The invention also consists in such other novel features of construction as shall hereinafter be more fully described and pointed out in the claim.

The present invention is herein shown in relation to an operative machine of this general class described in U. S. Patent No. 756,953, granted to August Gaulin April 12, 1904.

Figure 1, represents a side elevation of the improved machine. Fig. 2, represents a plan view of the same. Fig. 3, represents an enlarged sectional view, taken on line 3—3 Fig. 2, of the filter such as that shown and described in the above mentioned patent. Fig. 4, represents an enlarged vertical section through the mixing elements and parts adjacent thereto. Fig. 5, represents a bottom plan view of some of said parts to show one form of pressure device therefor. Fig. 6, represents a sectional view of the mixing or emulsifying elements similar to Fig. 4 but on an enlarged scale. Fig. 7, represents a cross sectional view taken on line 7—7 Fig. 6 looking in the direction indicated by the arrows. Fig. 8, represents a bottom plan view of the mixing valve or plug. Fig. 9, represents a diagrammatic view approximately illustrating the manner in which the apparatus acts on milk forced therethrough.

Similar numbers of reference designate corresponding parts throughout.

As shown in the drawings my improvement is illustrated in connection with a pumping apparatus similar to that described in the above named patent and in which 10 indicates a suitable base provided with a series of pump barrels 11, 11, slides 12, 12, for guiding the piston rods 13, 13 and the pump rods 14, 14 connected with said piston rods, which latter are operated by the eccentrics 15, 15 through the rotation of shaft 16, journaled in bearings, and furnished with the gear 17 which is driven by any suitable mechanism.

The milk, or other material, to be treated is supplied to the filter 18 and, after passing through said filter, enters the pipe 19 through branches of which it is drawn into the pump barrels 11, 11 from whence said milk, or material, is delivered under pressure to the reservoir 20 having, in connection therewith, the pressure gage 21 and the mixing chamber 22. Said mixing chamber 22 is shaped, exteriorly, as a screw threaded plug adapted to be secured at one end in a screw threaded socket of the reservoir 20 and, at the other end, adapted to receive the bore of casing 23 having the laterally disposed members 24, 24, the stuffing box 25 and the branch outlet 26. In the bores of said members 24, 24 are mounted the bolts 27, 27 which, at their screw threaded ends, are supplied with nuts 28, 28 bearing against the cross bar 29 perforated to slide upon said bolts 27, 27 and having a central perforation to receive the thrust rod 30, which is freely slidable through the stuffing box 25, and has an enlargement 31 between which and the cross bar 29 is located the expansion spring 32 adapted to exert an inward pressure on the thrust rod 30. Interiorly, the mixing chamber 22 is shaped, preferably as shown in Figs. 6 and 7 of the drawings, having the axially disposed channel 33 communicating at one end with the enlarged compartment 34 the end wall of which forms the flat seat 35 having the rectangular shoulder 36 defining this end of channel 33. Within the compartment 34 is located the valve or mixing element 37, preferably of agate or other suitable material, against which the thrust rod 30 bears. This valve or mixing element 37 is generally cylindrical in shape but has the peripherally disposed channels 38, 38 communicating with the enlarged recesses 39, 39 and the flat face 40 furnished with the axially disposed stem 41 having the conical end 42.

By reason of the pressure exerted by the spring 32 the face 40 of the mixing element or member 37 will be held in intimate contact with the seat 35 of its complemental mixing element or member, unless the pressure exerted on the fluid in channel 33 is sufficient to overcome the action of said spring. While I prefer to make use of spring pressure to hold said face 40 in operative relation to seat 35, in view of the reactive tendency of the spring against the pressure of the fluid, I do not wish to limit myself to any means for yieldingly holding said face 40 in relation to the seat 35 and the valve 37 may, in effect, be fixed with relation to seat 35 if desired.

The dimensions and relative positions of the complemental or coöperating mixing members, represented herein by the interior of the chamber 22, and the valve 37 are necessarily approximate and it is not my intention to limit my invention by such showing.

Milk, or other fluid containing fatty globules, supplied to the reservoir 20 at a suitable temperature, under pressure will enter channel 33 of the mixing compartment 22, the globules being under compression and tending, by reason of their elasticity, to expand. When such stream of fluid reaches the conical end of the valve stem 41 it spreads and the compressed fatty globules are first compacted together between the inclined surface of said conical end and the wall of channel 33, then being elongated and flattened as they (said globules) pass between the stem 41 and the wall of channel 33, but tending always to expand, until said globules reach the face 40 of valve 37 by which they are deflected abruptly outward while being engaged by the annular shoulder 36, as indicated in Fig. 9 of the drawings. At this point the annular stream of fluid spreads outward radially between the face 40 of valve 37 and seat 35 and those portions of the globules beyond the shoulder 36 are, to some extent, free to spread laterally but are flattened out still more and, as a result, are disrupted and torn into minute particles which are mixed and ground with the fluid between the surfaces 35 and 40, first spreading outward, between said surfaces, and then concentrating mainly toward and through the channels 38, 38 of the valve 37 while such fluid or material as passes over the edge of the face 40, between the channels 28, 28 is further mixed.

By the use of this apparatus the fatty globules, carried by the fluid under treatment, are disrupted and the fatty particles of said globules are so distributed and mixed with the fluid that the same is rendered homogeneous, of greater value as food products and less liable to decomposition by variations of temperature.

Having thus described my invention I claim as new and desire to secure by Letters Patent:

An apparatus for treating fluids containing fat globules comprising a pump, a pipe connected with said pump, a second pipe of larger diameter than said first pipe into which said first pipe leads whereby a flat annular shoulder is formed around the end of said first pipe, a flat cylindrical valve closely fitting said second pipe and fitting against said shoulder, said valve having peripherally disposed channels approximately parallel to its axis and an axially disposed stem extending into said first pipe and having a conical end, and means for pressing said valve against said shoulder.

JOHN W. DAVIES.

Witnesses:
FRANCIS J. GEOGAN,
HENRY J. MILLER.